(12) United States Patent
Schuyler et al.

(10) Patent No.: US 10,934,096 B1
(45) Date of Patent: Mar. 2, 2021

(54) CARRIER BELLOWS GUARDS

(71) Applicant: Amazon Technologies, Inc., Reno, NV (US)

(72) Inventors: Jacob Schuyler, Orlando, FL (US); Connor McIntyre, Apollo Beach, FL (US); Jonathan M. Spedden, Fort Worth, TX (US); Frank D. Rubino, Championsgate, FL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/448,861

(22) Filed: Jun. 21, 2019

(51) Int. Cl.
*B65G 17/32* (2006.01)
*B65G 17/34* (2006.01)
*B65G 47/74* (2006.01)
*B65G 21/00* (2006.01)

(52) U.S. Cl.
CPC ............. *B65G 21/00* (2013.01); *B65G 47/74* (2013.01); *B65G 2811/0657* (2013.01)

(58) Field of Classification Search
None
See application file for complete search history.

(56) References Cited

U.S. PATENT DOCUMENTS

| 5,890,584 A * | 4/1999 | Bonnet | B65G 15/42 |
| | | | 198/370.02 |
| 5,894,918 A * | 4/1999 | Bonnet | B65G 17/086 |
| | | | 198/370.02 |
| 5,921,378 A * | 7/1999 | Bonnet | B65G 17/08 |
| | | | 198/370.02 |
| 9,233,803 B2 * | 1/2016 | Pilarz | B65G 17/42 |
| 2005/0077144 A1 * | 4/2005 | Berkers | B65G 47/965 |
| | | | 198/370.01 |

* cited by examiner

*Primary Examiner* — Kavel Singh
(74) *Attorney, Agent, or Firm* — Hogan Lovells US LLP

(57) ABSTRACT

A bellows guard blocks movement of an item from a surface location of a flat sorter toward an adjacent bellows. The bellows guard may be mounted on a frame of the flat sorter proximate a carrier that receives the item. The bellows guard includes a vertical extension that is higher than the surface location to block movement of the item toward the bellows. The bellows guard may include a base for mounting the bellows guard to the frame and the base may be confined to the frame to enable pivoting moving of the carrier.

19 Claims, 14 Drawing Sheets

CARRIER BELLOWS GUARDS

BACKGROUND

Logistics operations, such as local or global shipping, may be performed at facilities that utilize automated sorting and packing systems, such as conveyor systems and the like. The conveyors may receive an item, such as a letter or package, for movement to another part of the facility where additional operations like packaging or shipping may be performed. To simplify the process, the conveyor systems may include a variety of sorting features, such as bomb bay sorters, where arms may pivot to release a floor holding the item, tilt-tray sorters, where the floor is tilted in a direction toward a chute, cross-belt sorters, where belts move items in a direction substantially perpendicular to a movement direction of the main conveyor, and the like. Each of these sorting features may be operational when the item is arranged within a designated staging area. However, due to the movement of conveyor systems throughout the facility, various support components, such as bellows, may be arranged between the staging areas to facilitate turns, twists, and the like. Items captured or otherwise obstructed by the bellows may be missed during the sorting.

BRIEF DESCRIPTION OF THE DRAWINGS

Various embodiments in accordance with the present disclosure will be described with reference to the drawings, in which.

DETAILED DESCRIPTION

Figure 1:
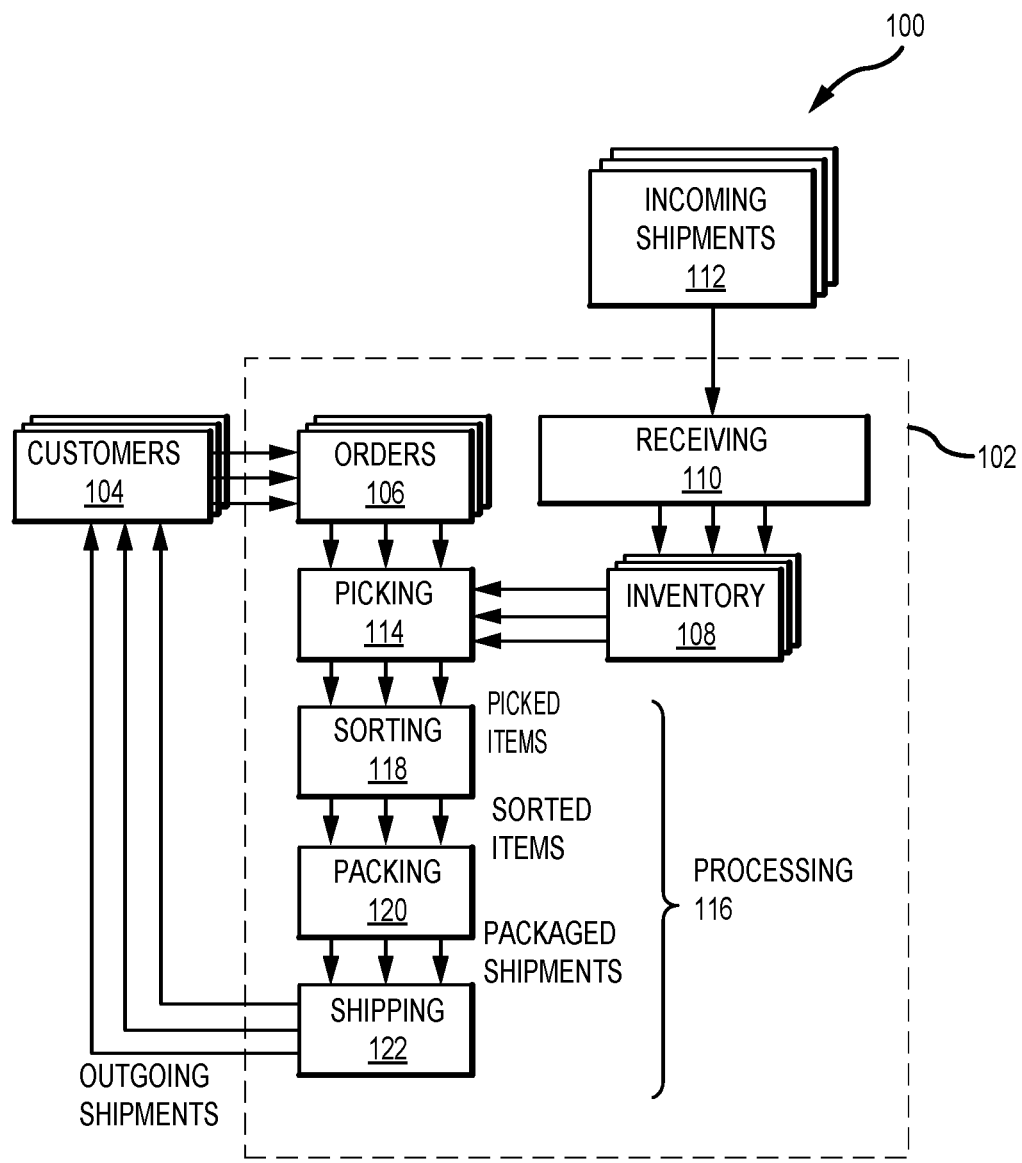
FIG. 1 illustrates an example environment of a logistics center in which aspects of the various embodiments can be utilized.

Systems and methods in accordance with various embodiments of the present disclosure overcome one or more of the above-referenced and other deficiencies in conventional approaches to sorting and shipping items at a logistics center, such as a fulfillment or distribution center. In particular, various embodiments provide a solution to problems associated with items being missed, miscategorized, or non-sorted when arranged on a conveyor system, such as a flat sorter or cross-belt sorter. For example, various embodiments may include a guard arranged between a carrier positioned to hold the item and a bellows arranged adjacent to the carrier. The guard may block or prevent items intended for the carrier from moving toward and onto the bellows, which may be an undesirable position resulting in the item either not being scanned, being improperly sorted, or not being sorted at all.

Embodiments of the present disclosure include structural components to block items from moving out of position from a carrier, which may be a designated portion of a flat sorter or other type of sorting device. The carrier may include a predetermined area that is designated by a frame, a perimeter, or a sortable surface area, where items, such as packages, letters, and the like, may be arranged in a logistics facility, such as a fulfillment or distribution center. The carriers may form portions of a conveyor system and may include bellows between adjacent carriers to enable flexion or looping of the conveyor system, which may include an endless conveyor driven by wheels or the like. In operation, it is undesirable for items to be arranged on the bellows because the carrier may be positioned to enable the item to be scanned or to sort the item into a designated location. For example, a cross-belt sorter may include a carrier having at least two floor components where the floor components included belts arranged substantially perpendicular to a direction of travel of the carrier to direct the item toward a desired location. If the item is arranged on the bellows, the item may not be directed to the desired location and may not be sorted, which may lead to manual intervention to locate and sort the item.

In various embodiments, certain types of fulfillment centers may include a wide variety of different packages or items that are sent out for shipment. For example, the fulfillment center may include cubic or rectangular packages with a variety of sizes, cylindrical packaging, flat or substantially flat envelopes, and soft packaged materials having a variety of different sizes and contours. By way of example only, a round item may be packaged in a package designed for flat or rectangular items, and as a result, the package may include a combination of different surface contours, which may lead to the package rolling or shifting during sorting operations. Due to the wide variety of shapes, various traditional sorting and distribution methods may be insufficient. For example, a flat sorter may have problems with round objects or objects with contours that allow the objects to roll away from the carriers and onto the bellows. However, pre-sorting by package contour and installing different equipment just for round or contoured packages is inefficient and costly. Accordingly, embodiments of the present disclosure include one or more structural features that may be incorporated into flat sorters to provide a structural barrier between the carrier and the bellows, thereby enabling a variety of different types of package shapes to be used with the same flat sorter and reducing the risk that items are shifted onto the bellows, which may lead to missed scans, improper sorting, or missed sorting.

Various embodiments may be helpful in large-scale operations, where disruptions in sorting or identifying packages may lead to general delays within the process. For example, a facility that deals with only one hundred items a day, a ten percent failure rate may only be ten items, with shutdowns or manual interventions being a burden, but not overwhelmingly so. However, a facility handling a million items a day may have thousands of shutdowns or manual inventions with just a one percent failure rate. Accordingly, it is advantageous to facilitating the flow of the entire operation to having packages effectively identified and sorted utilizing the equipment without manual intervention for mistakes.

Embodiments of the present disclosure enable substantially integrated structural guard features, which may also be referred to as barriers, and may be utilized with existing equipment without substantially modifying or otherwise altering operation of the equipment. For example, existing support structures may be arranged along the flat sorters and the guards may be arranged within a boundary of these structural supports. Furthermore, existing apertures may be utilized to secure the guards to the support structures. Additionally, in various embodiments, mechanical fasteners may be used to secure the guards to the flat sorters. Mechanical fasteners may provide an advantage of structural rigidity and integrity as compared to adhesives or the like. Furthermore, welding or types of connections may be challenging when used with electrified flat sorters, where welding may damage sensitive equipment. However, it should be appreciated that a variety of methods may be incorporated to secure the guards to various different areas of the flat sorters. Furthermore, new apertures and the like may be formed into the flat sorters to enable installation of the guard features.

FIG. 1 is a schematic block diagram of a logical representation of operation of an order fulfillment operation 100 which includes a logistics center 102, which may also be referred to as a fulfillment center or distribution center. In embodiments, the fulfillment center may fill orders received from customers 104. For example, the customers 104 may submit orders 106, for example through an online marketplace, and these orders 106 are transmitted to the fulfillment center 102. The orders 106 may specify one or more products for delivery to the customers 104. The products in the illustrated embodiment are selected from inventory 108 (e.g., stock storage). It should be appreciated that the logistics center 102 may store the inventory 108 on site, or may receive inventory via an associated receiving center 110. The receiving center 110 may receive incoming shipments 112. These incoming shipments 112 may be provided "on demand" or may be requested when an order 106 is received. As a result, the logistics center 102 may only store a limited amount of items in inventory 108, such as popular items for a region in which the logistics center 102 is located. However, it should be appreciated that the inventory 108 may also include any number of items and the goal of the inventory 108 may be to include a diverse selection of products to enable rapid fulfillment of customer orders 106.

In various embodiments, the orders 106 may be scanned and then picked via a number of different processes. For example, a picking process 114 may include providing information to an automated picking system that selects items that may be stored at various locations within the inventory 108. Furthermore, in embodiments, human personnel may manually pick the orders. It should be appreciated that the picking process 114 may also include prioritized or rapid selection of items to enable fulfillment of orders within a predetermined time period. The picked items from the inventory 108 may undergo processing 116, which may include a number of different steps. For example, processing 116 may include sorting 118, packing 120, and shipping 122.

In various embodiments, the sorting process 118 may utilize manual and automated systems, such as conveyor systems and the like. The conveyor systems may receive the picked items and deliver the picked items to different sections of the logistics center 102. The items may be arranged on the conveyor systems, such as on a conveyor belt, and then distributed to other portions of the system, such as a flat sorter, tilt sorter, and the like (e.g., sorting conveyors). Along the process, the items may be scanned and then directed toward the packing area. In embodiments, the sorting conveyors may transport the items to a designated area and then remove the items from the sorting conveyors. In various embodiments, the sorting conveyors include particular conveyance receptacles that receive one or more items. The conveyance receptacles may then be routed to particular destinations for the items contained within the receptacles in accordance with the orders 106 currently being processed (e.g., to sorting stations, under direction of a control system). For example, with the flat sorter a floor or portion of the floor of the conveyor belt may open to enable the items to fall through toward the packing area. Furthermore, the flat sorter may be a cross-belt sorter that includes belts operating substantially perpendicular to a direction of travel of the conveyor belt to direct the items to a desired location. In another example, the tilt sorters may reach a designated area and then tilt a portion to direct the item toward the packing area or another area. It should be appreciated that, in various embodiments, a picked, packed and shipped order does not necessarily include all of the items ordered by the customer and an outgoing shipment to a customer may include only a subset of the ordered items available to ship at one time from one inventory-storing location. In some other embodiments, picked items may be delivered to particular destinations via other means, such as automated guided vehicles, pallet jacks, and the like.

As noted above, in various embodiments, different types of items may be included within the inventory 108 and these items may have a variety of different shapes and sizes. As a result, utilizing the same sorting or conveying means may present a challenge, as moving round objects along a conveyor may be more challenging than a flat item, due to the round item having a tendency to roll. While trays or the like may be incorporated into the conveyor system to categorize or isolate various items, these may present an additional expense and may also limit how items are sorted or transported. For example, if trays are incorporated to a tilting sorter, a larger degree of tilt will be necessary to ensure removal of the item from the tray. Accordingly, systems and methods of the present embodiment include a guard or barrier arranged between different carriers of the sorting system to effectively maintain a position of the items on the carriers, even when outside forces or the like induce motion of the items.

Figure 2:
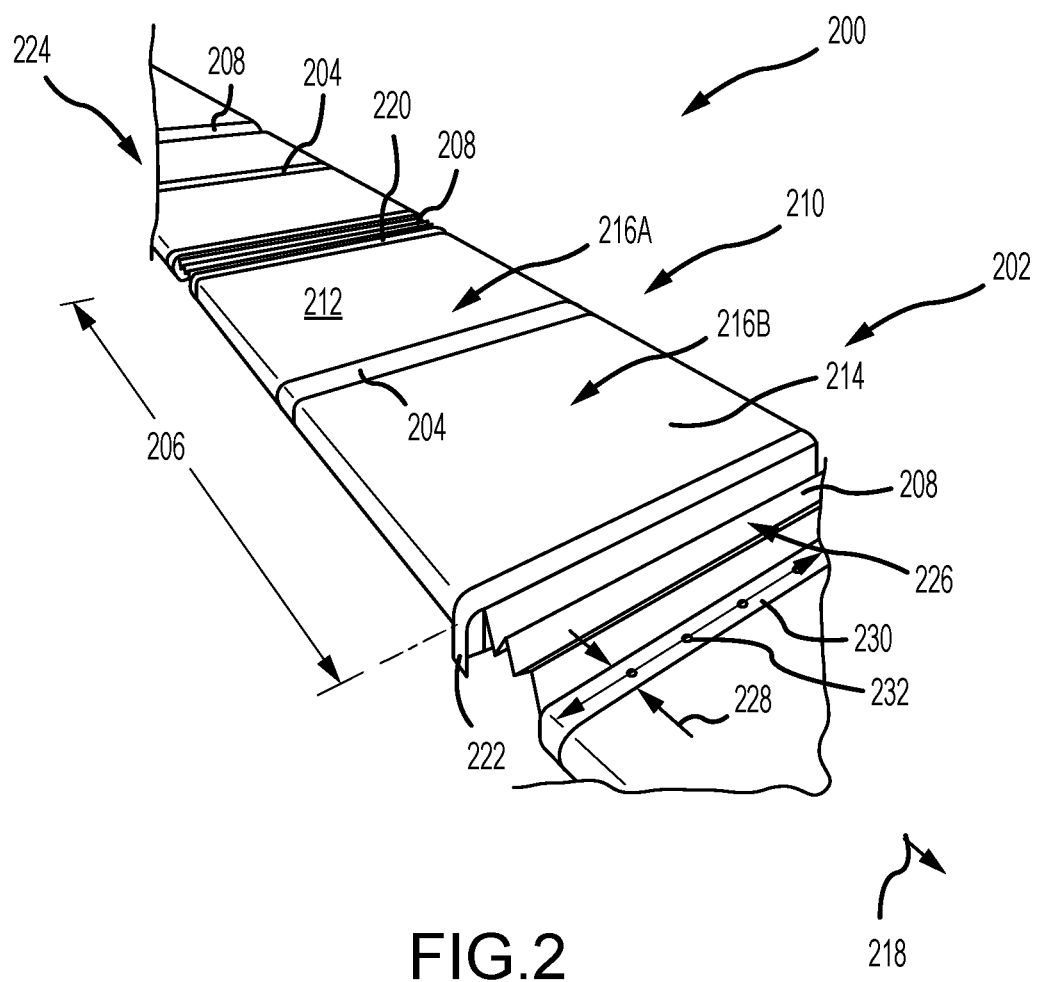
FIG. 2 illustrates a perspective view of an embodiment of a conveyor system in which aspects of various embodiments can be utilized.

FIG. 2 is a perspective view of an embodiment of a conveyor system 200 that includes a section of a flat sorter 202. The illustrated flat sorter 202 includes a plurality of carriers 204, having a length 206, that extend along a length of the flat sorter. Bellows 208 are positioned between adjacent carriers 204. In various embodiments, the bellows 208 represent a flexible area along the flat sorter 202 between the adjacent carriers 204. Accordingly, the flat sorter 202 may bend or otherwise curve along a pathway through a fulfillment center. Additionally, in embodiments, the bellows 208 enable the carriers 204 to flip, for example, in embodiments where the flat sorter 202 is an endless conveyor.

The illustrated carriers 204 include a platform 210 forming from a first floor section 212 and a second floor section 214. It should be appreciated that the pair of illustrated floor sections 212, 214 is for illustrative purposes only and that more or fewer floor sections may be included. In various embodiments, the floor sections 212, 214 may include individual, separately operable cross belts 216 that direct items arranged on the floor section 212, 214 in a direction substantially perpendicular to a direction of travel 218 of the conveyor system 200. In embodiments, each of the cross belts 216A, 216B may be operable to direct the items at the same time. However, in various embodiments, the cross belts 216A, 216B may be independently operable. Furthermore, it should be appreciated that the cross-belts 216A, 216B may be operable in two separate directions, each being opposite the other, to provide increased sorting options. Accordingly, the items may be transported along the conveyor system 200 and, when arranged a desired location, one or more of the cross belts 216A, 216B may activate to move the item off of the conveyor system 200 and toward the desired location. The platform 210 includes a frame section 220, 222, arranged at respective ends 224, 226 of the carrier 204. The frame sections 220, 222 in the illustrated embodiment are arranged proximate the bellows 208, and may, in certain embodiments, facilitate coupling of the bellows 208 to the carriers 204.

In the embodiment illustrated in FIG. 2, the frame sections 220, 222 include a respective width 228A, 228B and a respective length 230A, 230B. Furthermore, fasteners 232 are arranged along the lengths 230A, 230B. This fasteners 232 may be arranged through existing apertures or apertures formed for the inclusion of the fasteners 232. In operation, the frame sections 220, 222 may remain substantially stationary during operation of the floor sections 212, 214. As will be described below, in various embodiments, a bellows guard may be arranged along the frame sections 220, 224 to block or prevent items, such as packages, from moving off the carriers 204 and onto the bellows 208.

Figure 3:
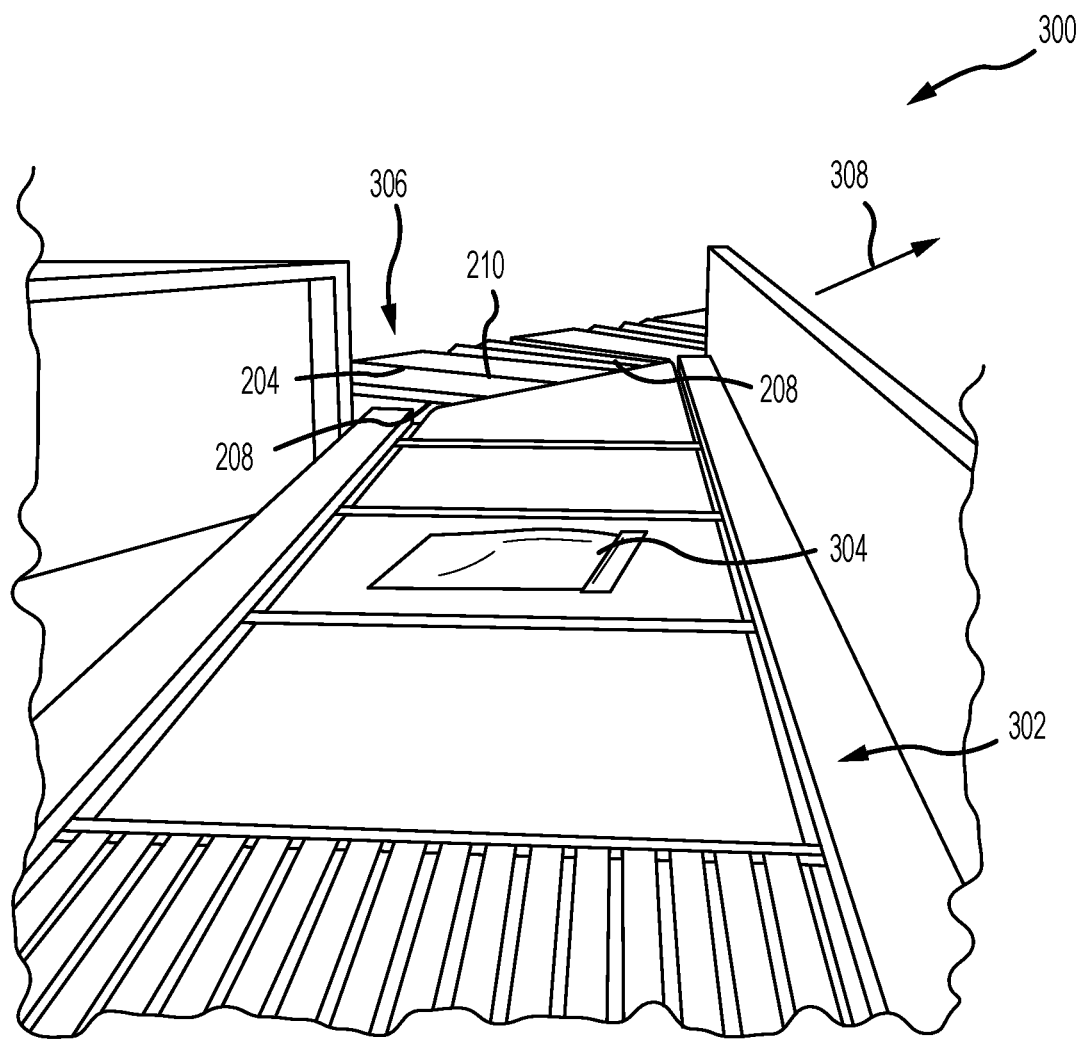
FIG. 3 illustrates a perspective view of an embodiment of a conveyor system in which aspects of various embodiments can be utilized.

FIG. 3 is a perspective view of an embodiment of a conveyor system 300 that includes a belt 302 transferring an item 304, which in this embodiment is a substantially rectangular package, to a flat sorter 306. In the illustrated embodiment, the belt 302 is moving in a direction into the plane of the page toward the flat sorter 306 and the flat sorter 306 is moving in a direction 308, represented by the arrow. As a result, the item 304 has a kinetic energy or momentum associated with the transference of the item 304 from the belt 302 to the flat sorter 306. The kinetic energy may cause the item 304 to move or shift on the flat sorter 306, which may be exacerbated by the additional energy added by the movement of the flat sorter 306. Accordingly, the item 304 may roll or otherwise adjust its position on the flat sorter 306 such that the item 304 moves off the carrier 204 and onto the bellows 208. Such movement is undesirable, as noted above, because the item 304 may not be directable via the cross belts 216, effectively disabling the carrier 204. That is, when the item 304 is arranged on the bellows 208, the cross belts 216 may not apply the force to the item 304 to direct the item 304 to the desired location. Furthermore, in some embodiments, the item 304 may not be properly scanned as the flat sorter 306 moves the item 304 through the facility because the scanners may be arranged to scan items positioned on the carriers 204 and not to scan items that are not on the carriers 204. However, it should be appreciated that the item 304 may be scanned even while arranged on the bellows 208.

Figure 4:
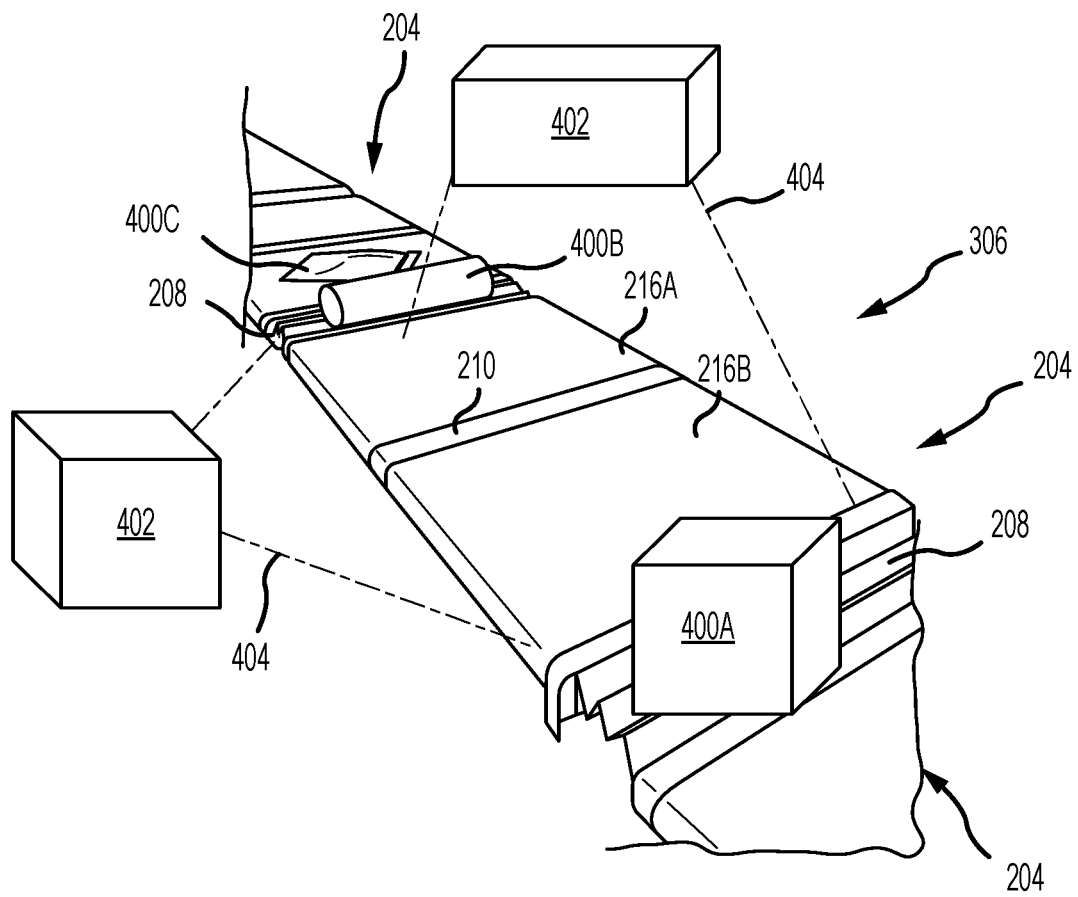
FIG. 4 illustrates a perspective view of an embodiment of a flat sorter of a conveyor system in which aspects of various embodiments can be utilized.

FIG. 4 is a perspective view of an embodiment of the flat sorter 306 including a plurality of items 400A, 400B, 400C, each arranged along a portion of the flat sorter 306. In the illustrated embodiment, the item 400A is a substantially rectangular package, the item 400B is a cylindrical package, and the item 400C is a contoured package arranged within a rectangular envelope. In the illustrated embodiment, the items 400A and 400B have moved from the carriers 204 to the bellows 208. For example, the motion of the flat sorter 306 or momentum from the belt 302 may cause the item 400B to roll along the flat sorter 306 toward the bellows 208. Furthermore, in various embodiments, the belt 302 may deliver the item 400A to the bellows 208, rather than the carrier 204. As a result, both the item 400A and the item 400B may be misaligned or improperly positioned on the flat sorter 306. In sharp contrast, the item 400C is arranged on the carrier 204, which enables proper scanning and sorting of the item 400C.

By way of example, the conveyor system 300 may include scanners 402 that may scan or log certain items as they travel along the conveyor system 300 toward the sorting, packaging, or shipping areas. However, it should also be appreciated that additional scanners may be utilized in other areas and/or scanners may not utilized with the conveyor system 300. For example, barcodes arranged on the items may be scanned to track the location of the items with respect to a carrier 204, which may provide information for where to ultimately deposit the items. In various embodiments, the scanners 402 may have a range 404, represented by the lines, that extends over the area of one carrier 204. As a result, items arranged on the bellows 208 proximate the carriers 204 may be missed. For example, in the illustrated embodiment, both the item 400A and the item 400B are outside of the range 404 of the scanners 402, and as a result, the items may not be tracked or otherwise associated with a carrier. This may disrupt the logistical process, with the flat sorter 306 being stopped in order to readjust the items, which may be done manually. Moreover, in embodiments, items may not be sorted or otherwise delivered to the proper destination, which may lead to missed shipments, which could upset customers waiting for their products. It should be appreciated that, in various embodiments, the range 404 of the scanners 402 may be sufficient to capture the items, but that the arrangement of the items on the bellows 208 may prevent proper sorting or deposition of the items. That is, the items 400 may still be scanned, even when positioned on the bellows 208, but the carrier 204 is essentially disabled from operating because activation of the cross belts 216 will not direct the items 400 to the location when arranged on the bellows 208. For example, if the item 400B is stuck on the bellows 208, when the carrier 204 reaches its intended destination, the item 400B will not be deposited when the cross belts 216 activate because the item 400B is not positioned on the cross belts 216. Accordingly, a shipment may be missed. Certain proposed solutions, such as air knives, have proven insufficient. An air knife sends a stream of compressed air across the bellows 208. While this may be useful for small, light packages, it is insufficient for a facility having multiple different sizes, shapes, and weights of packages.

For facilities operating with thousands or millions of packages, problems associated with packages stuck on bellows may lead to significant numbers of shipping errors or process interruptions to receive stuck packages. As a result, the flow of the process may be disrupted, which may further lead to late or missed shipments. This may reduce the overall capacity of the center, which is undesirable, especially in busy centers that continuously receive new orders. Furthermore, manual interruption may be undesirable for workers to track down and manually adjust or sort packages, all leading to inefficiencies in the process. Accordingly, embodiments of the present disclosure are directed toward bellows guards to block or otherwise stop items from moving toward the bellows to enable operations that are more efficient.

Figure 5:
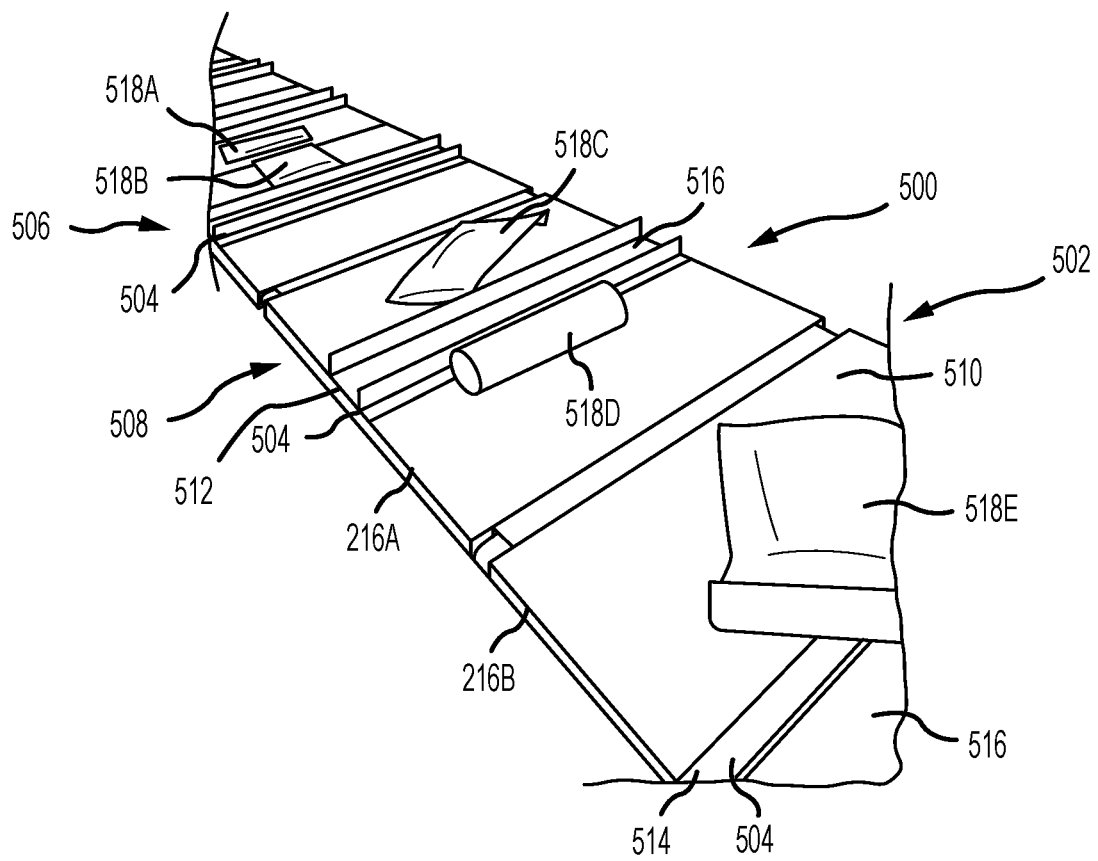
FIG. 5 illustrates a perspective view of an embodiment of a flat sorter including bellows guards, in accordance with various embodiments of the present disclosure.

FIG. 5 is a perspective view of an embodiment of a bellows guard system 500 for a flat sorter 502 with bellows guards 504 positioned at respective ends 506, 508 of carriers 510 of the flat sorter 502. In the illustrated embodiment, the bellows guards 504 are positioned along frame sections 512, 514 of the carriers 510, and as a result, movement and motion of the carriers 510 is not blocked or otherwise impacted by the bellows guards 504. For example, the cross belts 216 may be activated without interference from the bellows guards 504. As illustrated, the bellows guards 504 are not coupled directly to bellows 516 arranged between the carriers 510, and as a result, the functionality of the bellows 516 is also not altered by inclusion of the bellows guards 504.

The additional of the bellows guards 504 blocks movement of items arranged on the flat sorter 502 toward the bellows 516. For example, in the illustrated embodiment, items 518A, 518B, 518C, 518D, and 518E are arranged along the flat sorter 502 on respective carriers 510. The items 518A, 518B are substantially flat, rectangular packages that are positioned between the bellows guards 504 of their respective carrier 510. The item 518C is illustrated as a contoured item within a rectangular envelope on the carrier 510. In the illustrated embodiment, the item 518C abuts the bellows guard 504, which blocks movement of the item 518C toward the bellows 516. For example, the bellows guard 504 may block the item 518C from falling onto the bellows 516. Further illustrated are the items 518D, 518E arranged on the respective carrier 510. The illustrated item 518D is a cylindrical object, which may roll along the carrier 510. However, the bellows guard 504 blocks the cylindrical object from rolling toward the bellows 516. As a result, when the carrier 510 reaches the desired location, the item 518D may be properly sorted, for example, when the cross belts 216A, 216B are activated. Additionally, the item 518E is arranged against the bellows guard 504. In the illustrated embodiment, the item 518E may extend over the bellows guard 504, and may be arranged over the bellows 516, however, the item 518E is not in contact with the bellows 516, and moreover, movement of the item 518E in response to activation by the carrier 510, for example by the cross belts 216A, 216B, is not blocked or otherwise prevented.

As illustrated in FIG. 5, various different types of packages and items may be arranged along the flat sorter 502 within respective carriers 510 without intruding on or being stuck on the bellows 516. The inclusion of the bellows guards 504, when compared to the embodiment illustrated in FIG. 4, shows that the bellows guards 504 reduce the likelihood of items being stuck onto the bellows 516, for example due to misplacement or movement of the items. Accordingly, embodiments of the present disclosure may utilize the bellows guards 504 to facilitate placement and maintenance of various items, which may have different shapes and sizes, onto respective carriers 510.

FIGS. 6A-6F are schematic perspective views of embodiments of the bellows guards 504. It should be appreciated that the illustrated embodiments are provided by example only, and that other configurations may be utilized. Moreover, certain features from FIGS. 6A-6F may be incorporated into other bellows guards 504. Each of the bellows guards 504 illustrated in FIGS. 6A-6E includes a base 600 and a vertical extension 602, which may also be referred to as a wall or vertical barrier. As will be described below, the base 600 and the vertical extension 602 may be an integral piece or may be coupled together from independent pieces. Moreover, the illustrated bellows guard 604 of FIG. 6F does not include the base 600, and rather, may be directly coupled to the conveyor system via the vertical extension 602. In the illustrated embodiments, the base 600 forms a support platform for receiving the vertical extension 602. However, it should be appreciated that, in other embodiments, the base 600 may couple to the vertical extension 602, for example at a lower region, rather than arranging the vertical extension 602 on a surface 604 of the base 600. Furthermore, in various embodiments, the bellows guards 604 may be a common piece that is bent or curved at a transition between the base 600 and the extension 602. That is, the bellows guards 604 may be formed from a continuous component. In various embodiments, the base 600 includes a plurality of apertures 606, which may be used to mechanically couple the bellows guard 504 to the flat sorter 502, for example, to the frame sections 512, 514. The apertures 606 may receive one or more fasteners to secure the bellows guards 504 to the frame sections 512, 514 of the flat sorter 502.

The base 600 includes a width 608 and a length 610. In embodiments, the width 608 may substantially correspond to the width 228 of the frame sections 512, 514. In other embodiments, the width 228 may be less than the frame sections 512, 514. Furthermore, the length 610 may substantially correspond to the length 230 of the frame sections 512, 514. However, in other embodiments the length 610 may be shorter and a plurality of bellows guards 504 may be arranged along the length 230. The base 600 further has a height or thickness 612, which may be particularly selected to form a substantially flat or flush configuration with the carrier 510. As will be appreciated, each of the dimensions may be particularly selected based on configurations of the flat sorter 502. For example, the base 600 may be adjusted to correspond to the frame sections 512, 514 and the relative positions of the apertures 606 may be adjusted to correspond to the locations of the fasteners 232.

In the illustrated embodiment, the vertical extension 602 includes a height 614, which may be particularly selected based on anticipated operating conditions. For example, the height 614 may be selected to enable the conveyor to flip or roll over, where the conveyor is an endless conveyor. Furthermore, the height 614 may be selected to minimize the weight attached to the conveyor. However, the height 614 may also be a function of anticipated packages or items arranged on the conveyor. For example, if the height 614 is too large, added weight and expense are included without providing benefits. However, if the height 614 is too low, then items may roll over the bellows guard 504. The vertical extension 602 further includes a width 616 and a length 618. In various embodiments, the length 618 may be substantially equal to the base length 610. However, it should be appreciated that the length 618 may be greater than or less than the base length 610. Furthermore, as noted above, other measurements may also be particularly selected. For example, the base width 608 may be substantially equal to the vertical extension height 614, less than the vertical extension height 614, or greater than the vertical extension height 614.

The illustrated embodiments include the vertical extension 602 arranged at an angle 620 with respect to the base 600. In various embodiments, the angle 620 is substantially equal to 90 degrees, forming an "L-shaped" bellows guard 504. However, it should be appreciated that any other angle 620 may be utilized. For example, the angle 620 may be an acute angle or an obtuse angle. In various embodiments, the angle 620 may be approximately 10 degrees, approximately 20 degrees, approximately 30 degrees, approximately 40 degrees, approximately 50 degrees, approximately 60 degrees, approximately 70 degrees, approximately 80 degrees, approximately 100 degrees, approximately 110 degrees, approximately 120 degrees, approximately 130 degrees, approximately 140 degrees, approximately 150 degrees, approximately 160 degrees, or approximately 170 degrees. Furthermore, the angle 620 may vary between different bellows guards 504. For example, in embodiments where multiple bellows guards 504 are arranged along the length 230, different bellows guards 504 may have different angles.

Figure 6A:
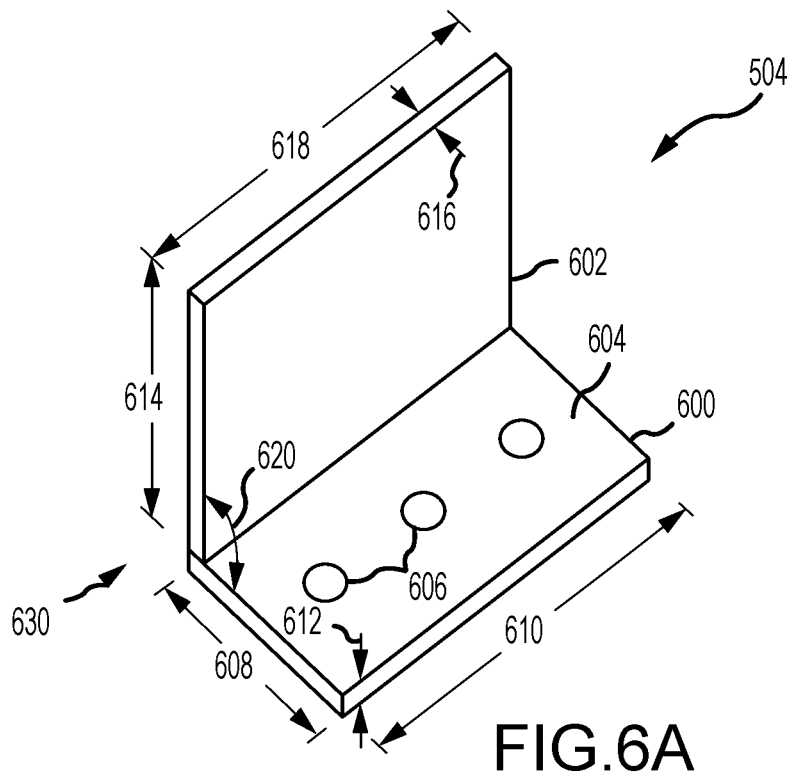
FIGS. 6A-6F illustrate perspective views of embodiments of bellows guards, in accordance with various embodiments of the present disclosure.
Figure 6B:
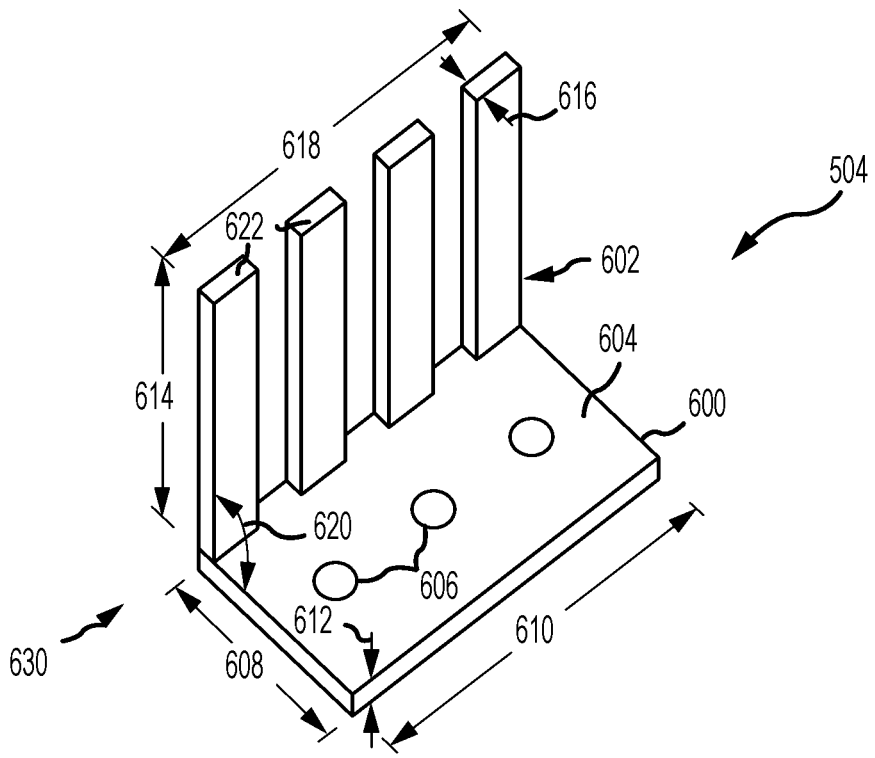
Figure 6C:
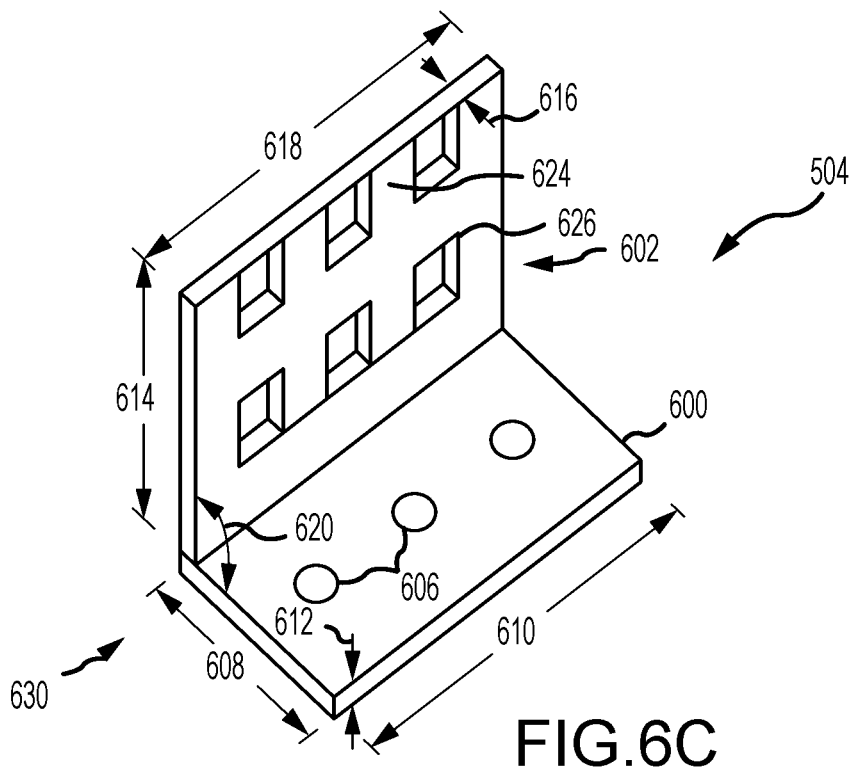
Figure 6D:
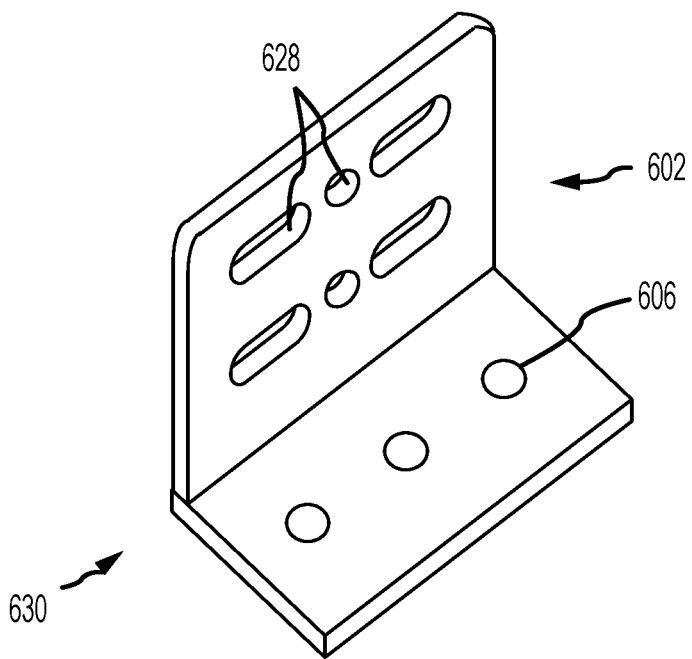

Furthermore, it should be appreciated that while the illustrated embodiments include substantially constant dimensions of the bellows guards 504 (e.g., the height 614 is constant along the length 618), in various embodiments different measurements may change or adjust. For example, the height 614 may be lower on a leading edge of the vertical extension 602 than on a trailing edge. This lower leading edge height may be advantageous for transfer to the flat sorter from the belt 302, as a lower leading edge may block or otherwise reduce the likelihood of items being stuck or otherwise hindered from the carriers. Accordingly, it should be understood that various dimensions may be varied in order to reduce weight or save materials of the bellows guards 504, among other reasons. Additionally, while embodiments may include substantially 90-degree corners on the components, the edges may be rounded or otherwise curved, as illustrated in FIG. 6D and which may also be incorporated into other embodiments or into the base 600.

Figure 6E:
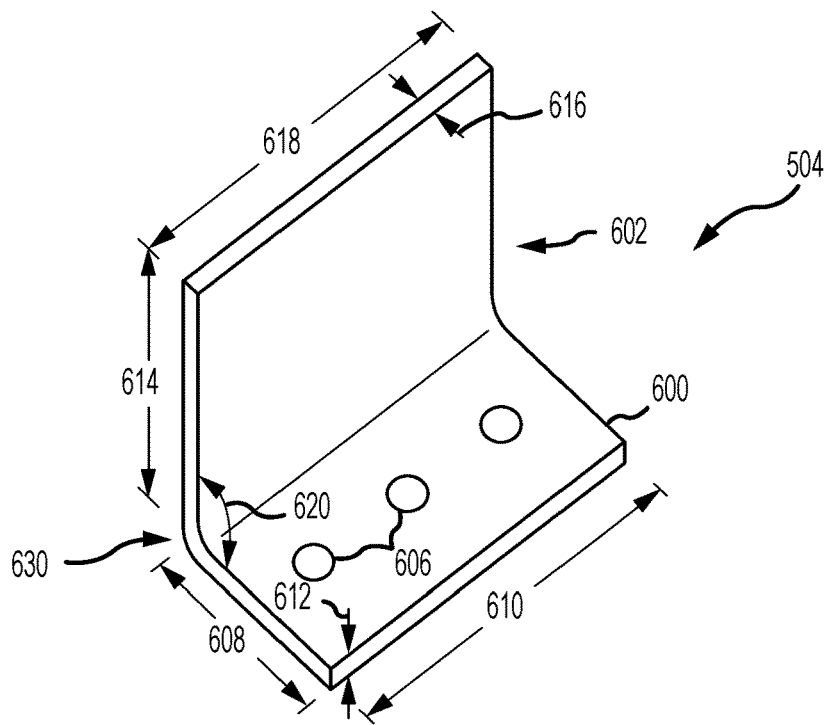
Figure 6F:
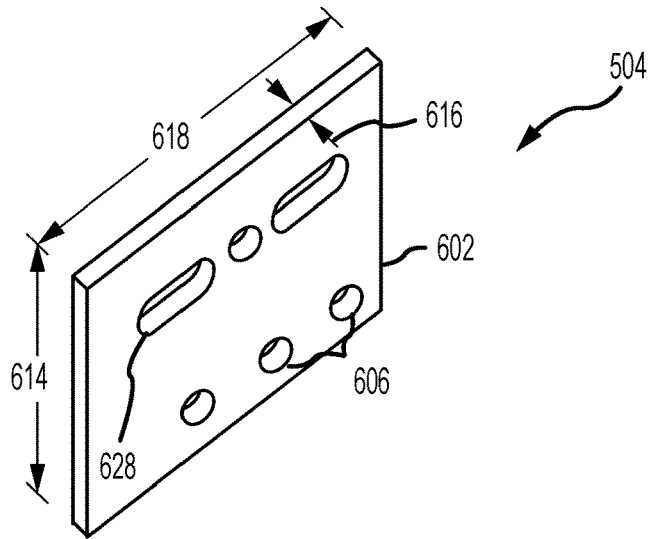

As illustrated in the embodiments of FIGS. 6A-6F, various configurations of the bellows guards 504 are presented by the present disclosure. For example, the embodiment illustrated in FIG. 6A includes a substantially solid vertical extension 602. In contrast, the embodiment of FIG. 6B includes slats 622 arranged at spaced intervals along the base 600. As noted above, each of the slats 622 may not have the same height, width, or length. For example, certain slats 622 may be higher than other slats 622. Moreover, each of the slats 622 may not be arranged at the same angle 620. For example, certain angles 620 may be obtuse while others are acute. The embodiment of FIG. 6C includes a lattice configuration including vertical bars 624 and horizontal bars 626. It should be appreciated that the bars 624, 626 may be overlapping bars or may be formed by square holes formed within the vertical extension 602. In other words, the lattice configuration may be formed by removing material from a solid piece. Moreover, the embodiment of FIG. 6D includes a lattice configuration that includes curved apertures 628 of various configurations. It should be appreciated that other configurations may be utilized to reduce the weight of the bellows guards 504. Additionally, the embodiment of FIG. 6E illustrates the bellows guard 504 formed from a solid, continuous piece. For example, a transition 630 is arranged between the base 600 and the vertical extension 602. As noted above, the transition 630 may be incorporated in other embodiments including different features, such as the slats or lattice configuration. Moreover, different configurations may be more suitable for different shipping operations. Additionally, while the illustrated bases 600 of FIGS. 6A-6D include a substantially solid piece with the apertures 606, it should be appreciated that other configurations, such as the configurations illustrated for the vertical extensions 602 of FIGS. 6A-6E may also be incorporated into the bases 600. The embodiment of FIG. 6F does not include the base 600, and rather, incorporates only the vertical extension 602. The illustrated vertical extension 602 includes the curved apertures 628 and the apertures 606 both positioned on the vertical extension 602. In various embodiments, the conveyor system may include, or be modified to include, apertures to couple the bellows guard 504 between the carriers 510 and bellows 516.

In various embodiments, the bellows guards 504 may be formed from a metal, plastic, composite material, or a combination thereof. For example, the bellows guards 504 may be formed from a lightweight, yet strong, metal, such as aluminum. Additionally, the bellows guards 504 may be any type of plastic or composite material, such as carbon fiber. Furthermore, different components may be formed from different materials, such as a metal base with a plastic vertical extension. Accordingly, it should be appreciated that various configurations may be utilized to form lightweight, strong, and cost effective bellows guards 504.

Figure 7A:
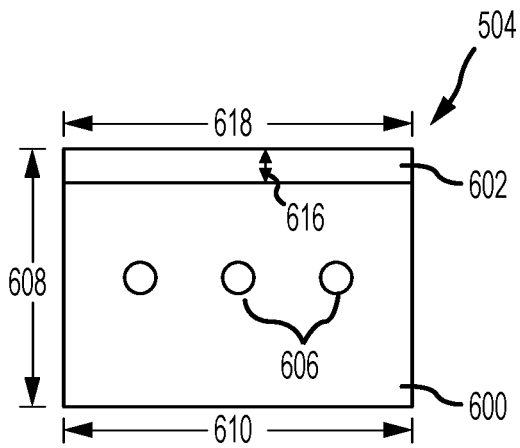
FIGS. 7A-7F illustrate top plan views of embodiments of bellows guards, in accordance with various embodiments of the present disclosure.
Figure 7B:
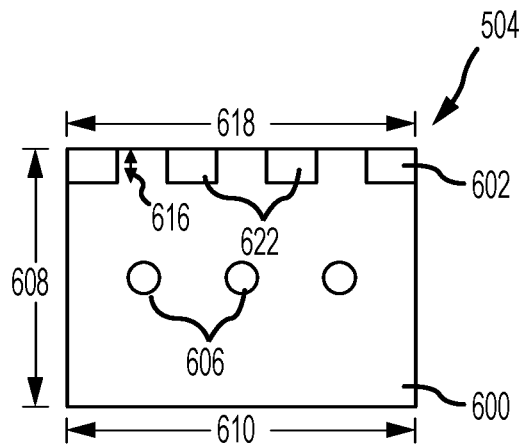
Figure 7C:
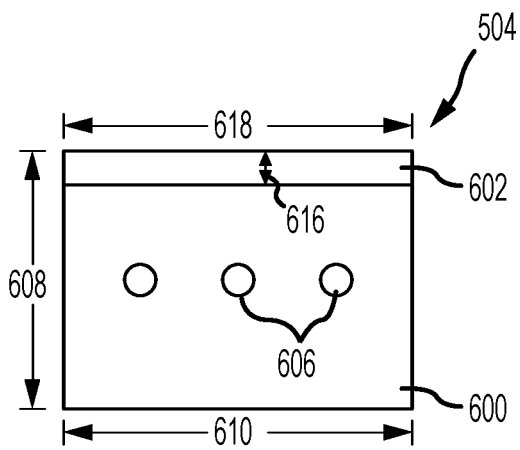
Figure 7D:
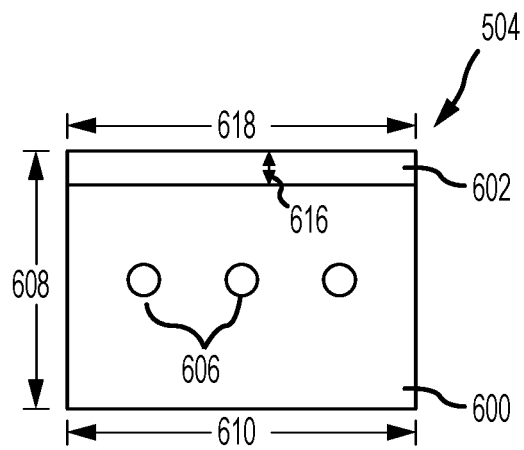
Figure 7E:
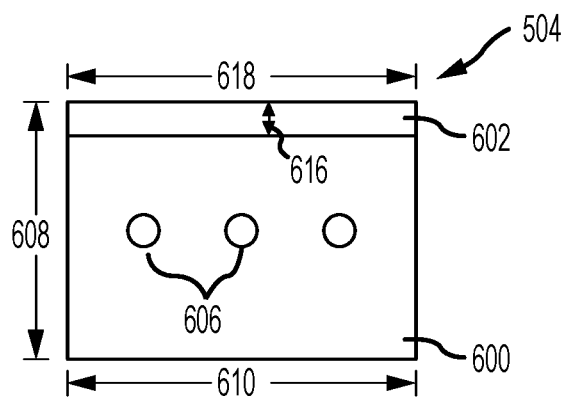
Figure 7F:
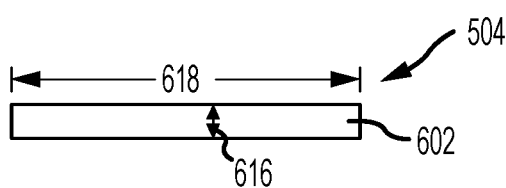

FIGS. 7A-7F are top plan views of embodiments of the bellows guards 504. The illustrated embodiments of FIGS. 7A-7E include the respective bases 600 and vertical extensions 602. As illustrated, the bases 600 include the widths 608 and the lengths 610 and the extensions 602 include the widths 616 and the lengths 618. The embodiment of FIG. 7B illustrates the slats 622 arranged along the surface 604 of the base 600. Each embodiment shown in FIGS. 7A-7E also includes the apertures 606 extending through the base, but it should be appreciated that, in various embodiments, different configurations may be included for the base 600, as described above. Because the embodiment of FIG. 7F does not include the base 600, only the vertical extension 602 is illustrated.

Figure 8A:
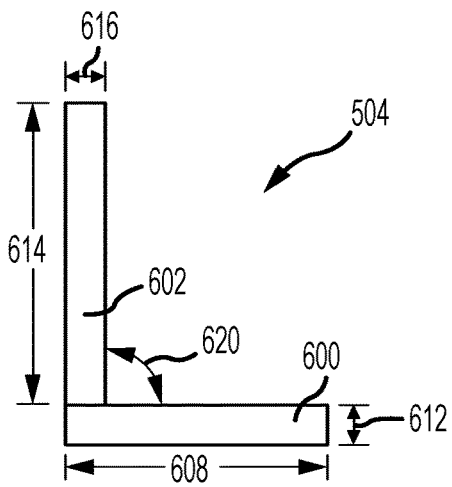
FIGS. 8A-8F illustrate side elevational views of embodiments of bellows guards, in accordance with various embodiments of the present disclosure.
Figure 8B:
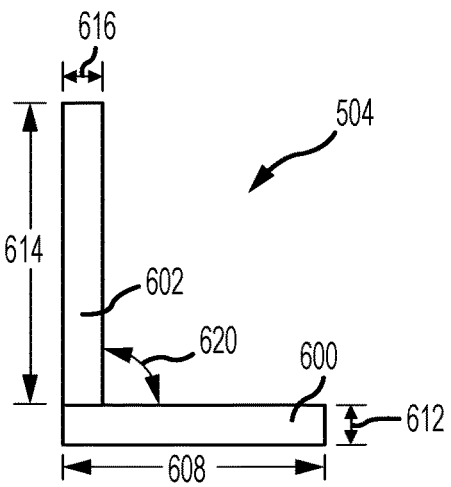
Figure 8C:
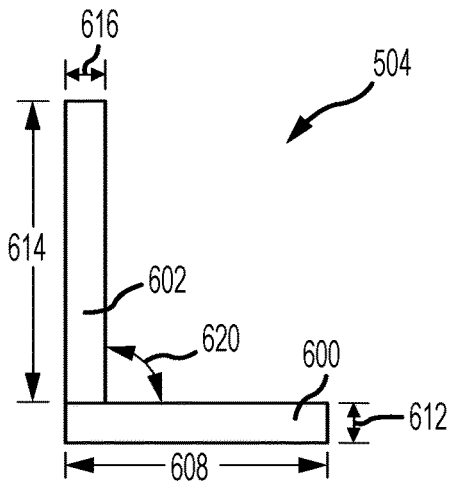
Figure 8D:
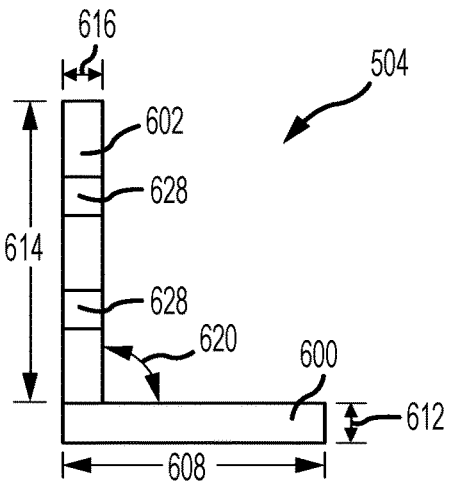
Figure 8E:
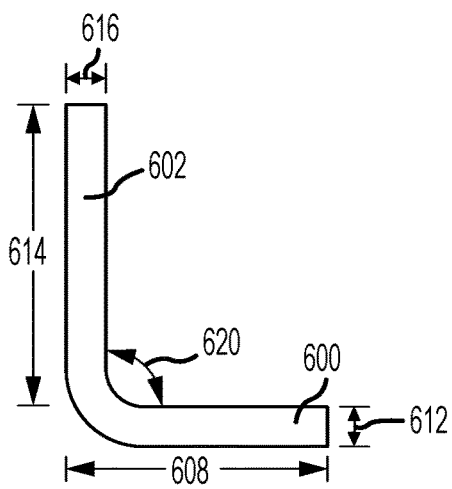
Figure 8F:
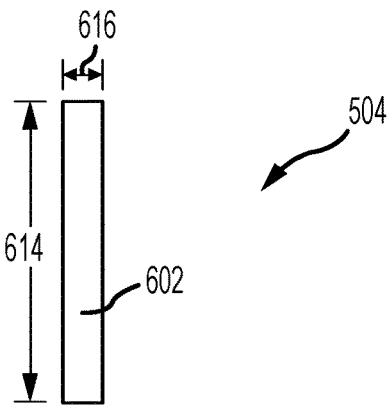

FIGS. 8A-8F are side elevational views of embodiments of the bellows guards 504. The illustrated embodiments include the respective bases 600 and vertical extensions 602 for FIGS. 8A-8E and no base 600 for FIG. 8F. As illustrated, the bases 600 include the width 608 and the heights 612 and the extensions 602 include the widths 616 and the heights 614. The embodiment of FIG. 8D illustrates the curved apertures 628 extending along the vertical extension 602, which may reduce the weight of the bellows guard 604. FIG. 8E illustrate the transition 630 between the base 600 and the vertical extension 602 in embodiments where the bellows guard 504 is formed from a continuous piece. Furthermore, the angle 620 is illustrated, which is illustrated as being approximately 90 degrees, but may vary, as described above. Each embodiment of FIGS. 8A-8E also includes the apertures 606 extending through the base, but it should be appreciated that, in various embodiments, different configurations may be included for the base 600, as described above.

Figures 9A, 9B:
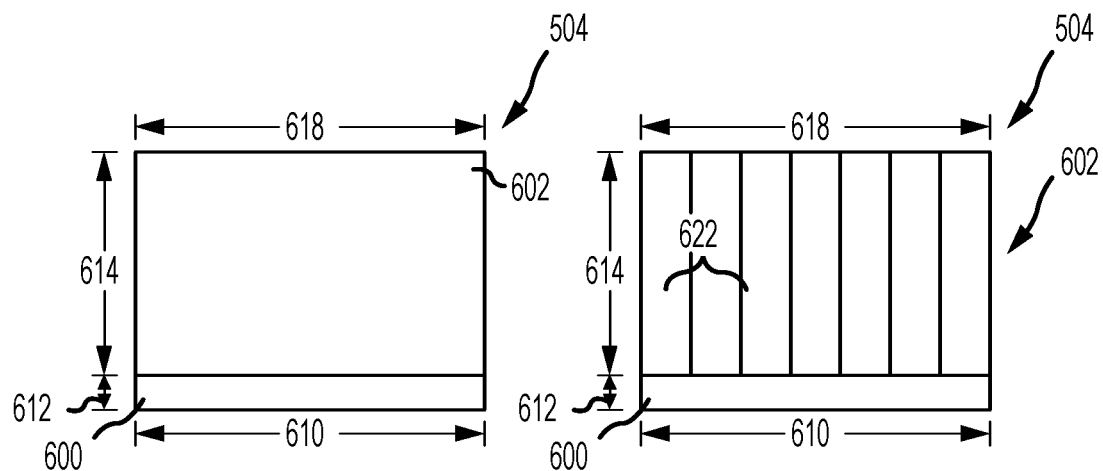
FIGS. 9A-9F illustrate front elevational views of embodiments of bellows guards, in accordance with various embodiments of the present disclosure.
Figures 9C, 9D:
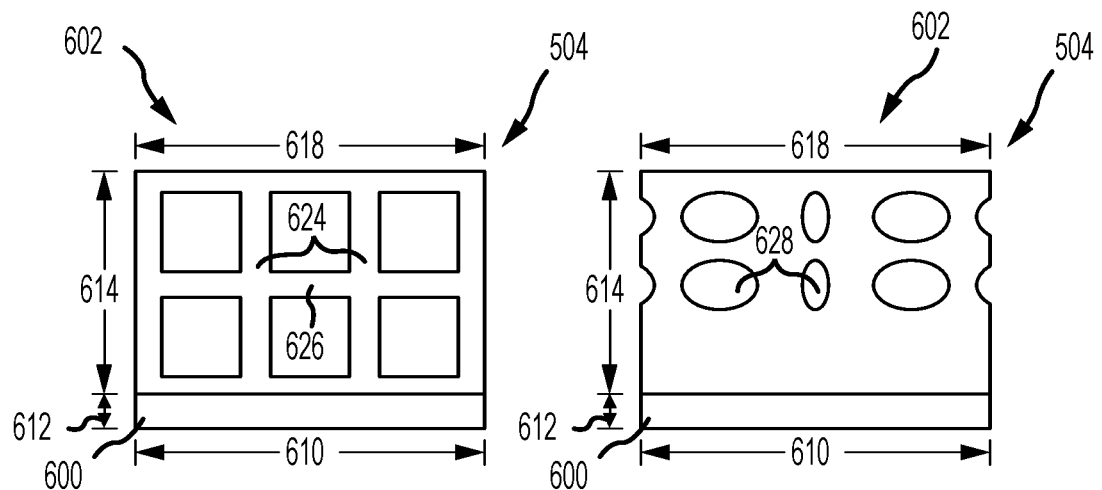
Figures 9E, 9F:
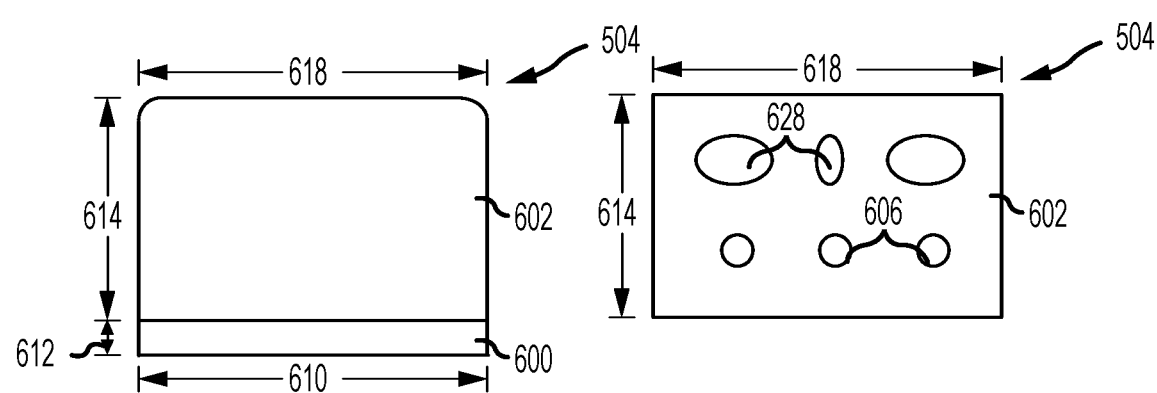

FIGS. 9A-9F are front elevational views of embodiments of the bellows guards 504. The illustrated embodiments include the respective bases 600 and vertical extensions 602. However, as noted above, the embodiment of FIG. 9F does not include the base 600. As illustrated, the bases 600 include the lengths 610 and the heights 612 and the extensions 602 include the heights 614 and the lengths 618. The embodiment of FIG. 9A includes a substantially solid vertical extension 602. The embodiment of FIG. 9B includes the slats 622 and the embodiment of FIG. 9C includes the lattice configuration with the vertical bars 624 and the horizontal bars 626. In the embodiment illustrated in FIG. 9D, the curved apertures 628 are arranged along the vertical extension 602. The curved apertures 628 are arranged in a pattern in the illustrated embodiment, and are substantially oval shaped. However, it should be appreciated that the curved apertures 628 may be arranged in any configuration and may be circular, ovals, any other curved shape, or any combination of shapes. Furthermore, it should be appreciated that other shapes, such as squares, rectangles, triangles, and the like may also be used. Additionally, in various embodiments the vertical extensions 602 are illustrated as substantially square or rectangular, but it should be appreciated that the edges may be angled or otherwise curved in order to reduce material usage or to provide ramps or guidance for packages directed toward the carriers 510, such as the embodiment of FIG. 9E. FIG. 9F includes the vertical extension 602 that includes the curved apertures 628 and apertures 606 for mounting the vertical extension 602.

Figure 10A:
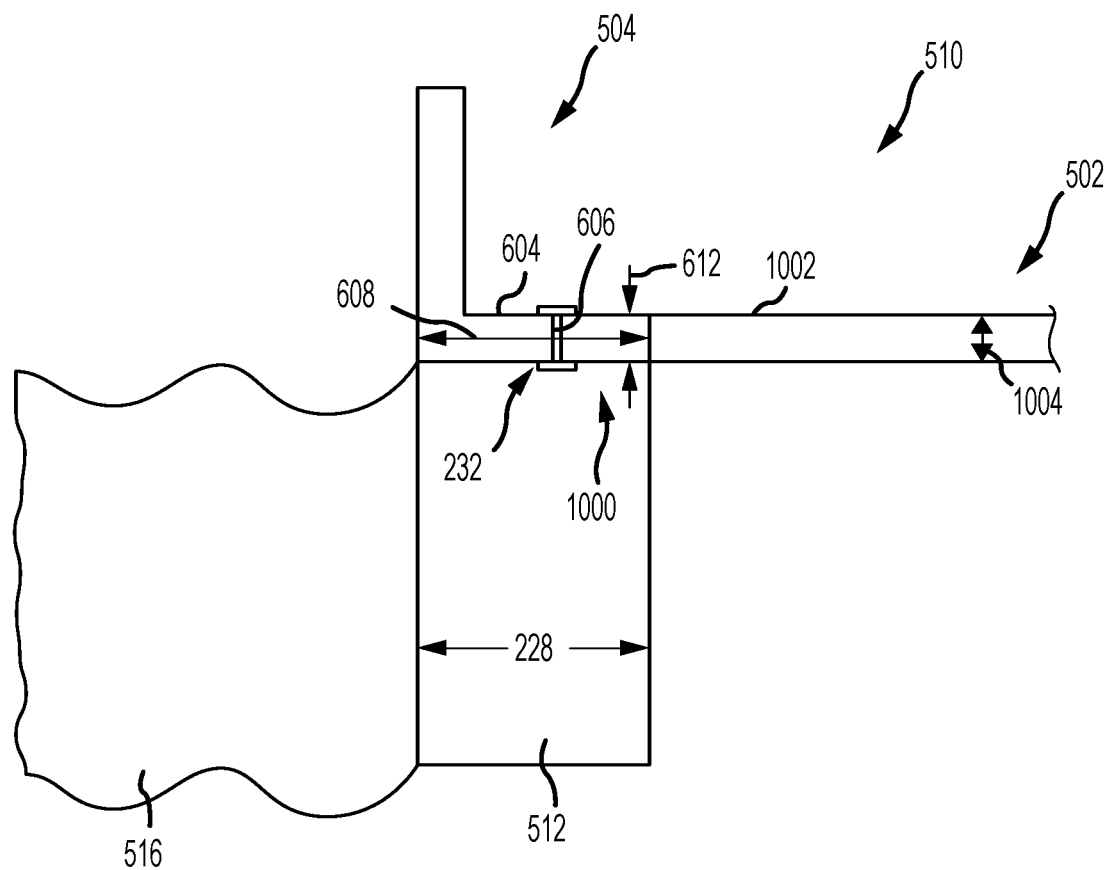
FIG. 10A illustrates a schematic cross-sectional view of an embodiment of a bellows guard coupled to a flat sorter, in accordance with various embodiments of the present disclosure.

FIG. 10A is a cross-sectional view of an embodiment of the bellows guard 504 mechanically coupled to the flat sorter 502. As illustrated, the bellows 516 are arranged proximate the carrier 510 and separated by the frame section 512. The bellows guard 504 is positioned on the frame section 512, which forms a mounting platform 1000 to receive the bellows guard 504. In the illustrated embodiment, a width 228 of the frame section 512 is substantially equal to the width 608 of the base 600 of the bellows guard 504. However, as noted above, in various embodiments the width 608 may be less than the width 228. In various embodiments, the carrier 608 includes a cover 1002, which may be textured, having a thickness 1004. The cover 1002 may correspond to the cross belt 216, in various embodiments. The thickness 1004 may be substantially equal to the height 612 of the base 600, and as a result, the surface 604 of the base 600 may be substantially flush or aligned with the cover 1002. But, it should be appreciated that the thickness 1004 may not equal the height 612 and that other factors may be considered to provide the flush or aligned surface illustrated in FIG. 10A. Accordingly, items arranged on the carrier 510 may not snag or otherwise be blocked or impaired by the base 600.

In various embodiments, the apertures 606 of the base 600 may be utilized with extending fasteners 232 used with the flat sorter 502. For example, the position of the apertures 606 may correspond to the position of the fasteners. In the illustrated embodiment, the fasteners 232 is coupled to the base 600 through the mounting platform 1000 to secure the base 600 to the frame section 512. In various embodiments, the fastener 232 is a bolt, where a head of the bolt is arranged on an underside of the base 600 to facilitate the substantially flush or flat arrangement at the surface 604. The mechanical coupling may provide a robust connection without altering the frame section 512. For example, welding or chemical coupling means may damage electrical components of the flat sorter 502. Additionally, adhesives and the like may fail during continued operation, which is undesirable because the flat sorter 502 is moving throughout the facility.

FIG. 10A illustrates the bellows guard 504 positioned to block items from moving from the carrier 510 to the bellows 516. As shown, movement or operation of the bellows 516 is not impaired by the bellows guard 504 because the bellows guard 504 is constrained to the mounting platform 1000. Furthermore, operation of the carrier 510, such as activation of the cross belts 216, which may correspond to the cover 1002, to direct items to a desired location, is not impaired due to the location of the bellows guard 504. In this manner, items arranged on the carrier 510 may be blocked from moving toward the bellows 516 without changing operation of the flat sorter 502.

Figure 10B:
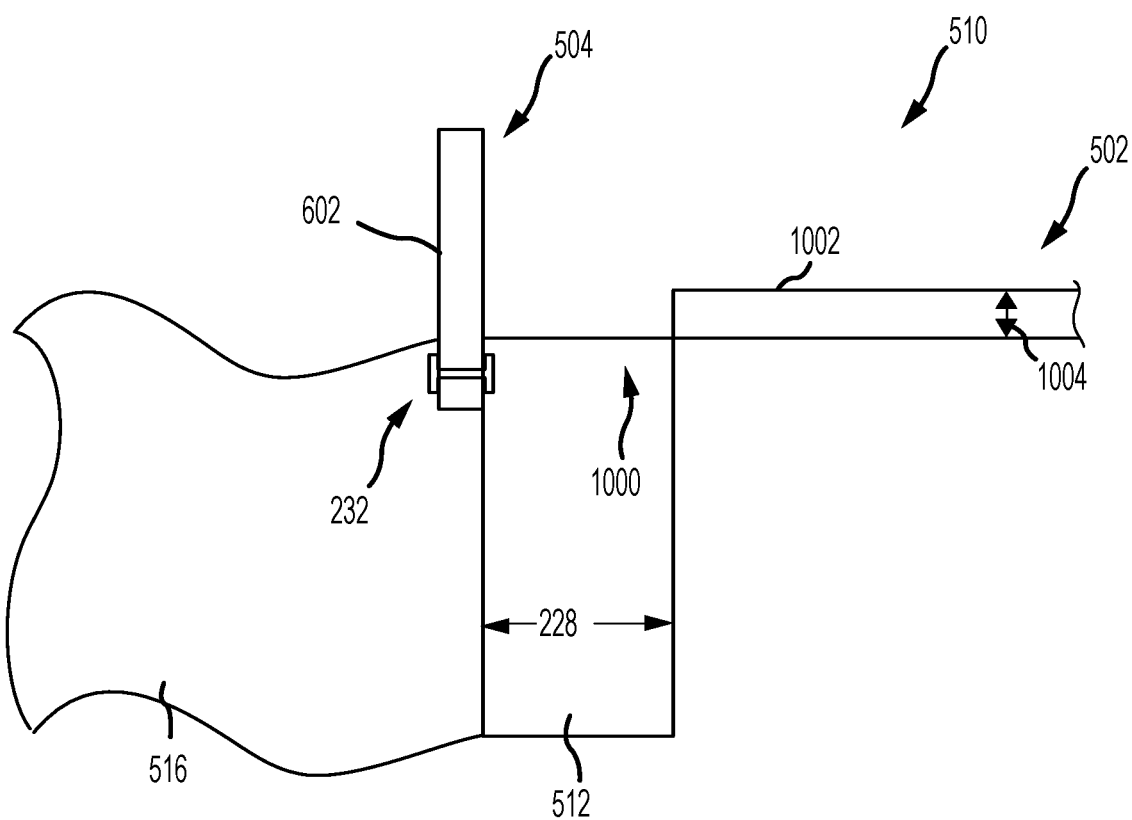
FIG. 10B illustrates a schematic cross-sectional view of an embodiment of a bellows guard coupled to a flat sorter, in accordance with various embodiments of the present disclosure.

FIG. 10B is a cross-sectional view of an embodiment of the bellows guard 504 mechanically coupled to the flat sorter 502. As illustrated, the bellows 516 are arranged proximate the carrier 510 and separated by the frame section 512. The bellows guard 504 is positioned on the frame section 512, which forms a mounting platform 1000 to receive the bellows guard 504. In various embodiments, the carrier 608 includes the cover 1002, which may be textured, having a thickness 1004. The cover 1002 may correspond to the cross belt 216, in various embodiments.

In various embodiments, the apertures 606 of the vertical extension 602 may be utilized with extending fasteners 232 used with the flat sorter 502. For example, the position of the apertures 606 may correspond to the position of the fasteners. In the illustrated embodiment, the fasteners 232 is coupled to the vertical extension through the mounting platform 1000, which is a vertical wall of the frame section 512, to secure the vertical extension 602 to the frame section 512. The mechanical coupling may provide a robust connection without altering the frame section 512. For example, welding or chemical coupling means may damage electrical components of the flat sorter 502. Additionally, adhesives and the like may fail during continued operation, which is undesirable because the flat sorter 502 is moving throughout the facility. In certain embodiments, apertures may be formed in the frame section 512 to receive the fastener 232. The apertures may be pre-existing or added at a later time.

FIG. 10B illustrates the bellows guard 504 positioned to block items from moving from the carrier 510 to the bellows 516. As shown, movement or operation of the bellows 516 is not impaired by the bellows guard 504 because the bellows guard 504 is constrained to the mounting platform 1000. Furthermore, operation of the carrier 510, such as activation of the cross belts 216, which may correspond to the cover 1002, to direct items to a desired location, is not impaired due to the location of the bellows guard 504. In this manner, items arranged on the carrier 510 may be blocked from moving toward the bellows 516 without changing operation of the flat sorter 502.

Figure 11:
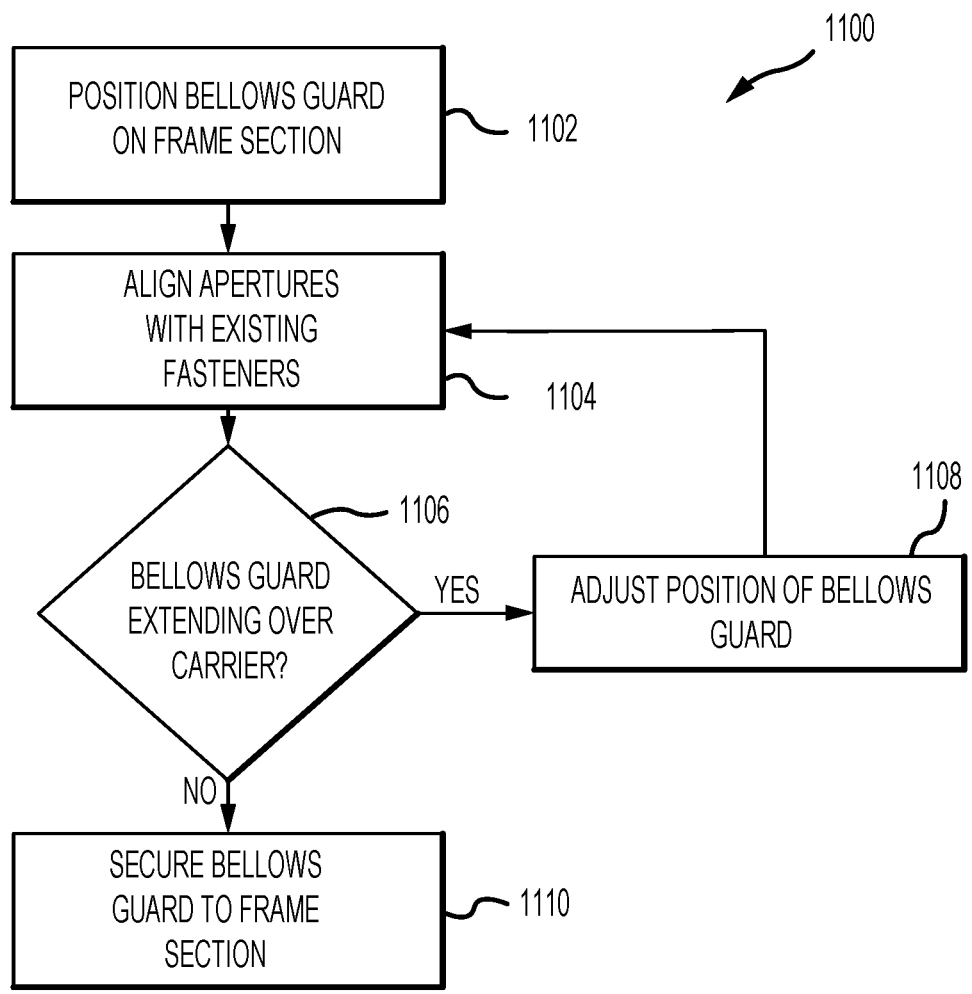
FIG. 11 illustrates an example process for coupling a bellows guard to a flat sorter, in accordance with various embodiments of the present disclosure.

FIG. 11 illustrates an example method embodiment 1100 for coupling bellows guards to flat sorters. It should be understood that there can be additional, fewer, or alternative steps performed in similar or alternative orders, or in parallel, within the scope of the various embodiments unless otherwise stated. The example begins with positioning a bellows guard on a frame section of a flat sorter 1102. It should be appreciated that, while various embodiments discuss use with a flat sorter, in other embodiments different types of sorting equipment may also utilize the bellows guards. The bellows guards are aligned with existing fasteners, or apertures related to the fasteners, on the frame section 1104. For example, existing bolt holes or screws may be utilized to couple other components to the flat sorter, which may also be used to secure the bellows guard. The bellows guard may be checked to determine if the bellows guard overlaps the carrier 1106. It may be undesirable to overlap the carrier because the bellows may interrupt operation of the carrier. If the bellows guard does overlap the carrier, the position of the bellows guard may be adjusted 1108. If not, the bellows guard is secured to the frame section 1110. In this manner, the bellows guard may be quickly installed, using existing apertures or features of the frame section, to improve operation of the flat sorter.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for sorting items within a fulfillment center, comprising:
   a first carrier for receiving an item on a first carrier surface, the first carrier including a first floor section and a second floor section, including respective first conveyors to direct the item toward a determined location;
   a second carrier for receiving a second item on a second carrier surface, the second carrier including a third floor section and a fourth floor section, including respective second conveyors to direct the second item toward a determined location;
   a bellows positioned between the first carrier and the second carrier, the bellows coupled to respective ends of the first carrier and the second carrier;
   a first bellows guard positioned between the first carrier and the bellows, a first base of the first bellows guard positioned on a first mounting surface formed on a first frame section parallel to the first carrier surface, and a first vertical extension of the first bellows guard extending a first bellows guard vertical distance higher than the first carrier surface; and
   a second bellows guard positioned between the second carrier and the bellows, a second base of the second bellows guard positioned on a second mounting surface formed on a second frame section parallel to the second carrier surface, and a second vertical extension of the second bellows guard extending a second bellows guard vertical distance higher than the second carrier surface.

2. The system of claim 1, wherein each of the first bellows guard and the second bellows guard comprises:
   the first base having an aperture for coupling the first base to the first mounting surface; and
   the first vertical extension arranged at an angle with respect to the first base.

3. The system of claim 2, wherein the angle is between 70 degrees and 110 degrees.

4. The system of claim 2, wherein a width of the first base is constrained to the first frame section.

5. A bellows guard for blocking movement of an item on a conveyor, comprising:
   a base configured to couple the bellows guard to a frame section of a carrier, the base having apertures to receive a fastener; and
   a vertical extension coupled to the base, the vertical extension spanning to a greater vertical height than a surface of the carrier, the vertical extension arranged at an angle with respect to the base, wherein the angle is between 70 degrees and 110 degrees;
   wherein the base is confined to the frame section and the carrier is free to move with respect to the base, the frame section arranged between the carrier and a bellows.

6. The system of claim 5, wherein the vertical extension includes a lattice configuration extending along a length of the base.

7. The system of claim 5, wherein the vertical extension includes a plurality of slats arranged along a length of the base, the plurality of slats having a space between adjacent slats.

8. The system of claim 5, wherein a surface of the base, positioned at a mounting location of the frame section, is substantially flush with a surface of the carrier.

9. The system of claim 5, wherein the vertical extension further comprises:
   a first vertical extension height at a leading edge; and
   a second vertical extension height at a trailing edge, wherein the first vertical extension height is less than the second vertical extension height.

10. The system of claim 5, further comprising:
    a transition between the vertical extension and the base, the transition being arcuate, and wherein the vertical extension and the base are formed from as a unitary piece.

11. The system of claim 5, wherein the bellows are free to move with respect to the bellows guard, and the bellows guard maintains a spaced relationship with both the bellows and the surface of the carrier.

12. The system of claim 5, wherein the bellows guard is formed from a metal, a plastic, a composition material, or a combination thereof.

13. The system of claim 5, wherein the vertical extension is configured to couple to the frame section between the bellows and the frame section to block an item arranged on the carrier from moving onto the bellows.

14. The system of claim 5, wherein the vertical extension includes a lattice configuration extending along a length of the base, the lattice configuration comprising curved apertures arranged between horizontal bars and vertical bars.

15. The system of claim 5, wherein a length of the bellows guard is less than a length of the frame section of the carrier.

16. A system for maintaining a position of an item arranged on a flat sorter, comprising:
    a plurality of carriers, forming at least a portion of the flat sorter, configured to receive an item on a respective surface;
    a plurality of bellows, arranged between adjacent carriers, the bellows flexing in response to movement of the carriers;
    a plurality of frame sections, a respective frame section supporting at least a portion of a carrier of the plurality of carriers, the plurality of frame sections each including a mounting location parallel to the respective surface; and
    a plurality of bellows guards, a base of a respective bellows guard of the plurality of bellows guards arranged at each respective frame section between the respective carriers and respective bellows, the respective bellows guard coupled at the mounting location and a vertical extension of the respective bellows guard extending a vertical distance above the respective surface of the carrier to block movement of the item from the respective carrier to the respective bellows.

17. The system of claim 16, wherein a surface of the base of the respective bellows guard is substantially flush with the respective surface of the carrier.

18. The system of claim 16, wherein each of the bellows guards of the plurality of bellows guards comprises:
    the base having an aperture for coupling the base to the mounting location; and
    the vertical extension arranged at an angle with respect to the base.

19. The system of claim 18, wherein the angle is between 70 degrees and 110 degrees.

* * * * *